US 9,758,377 B2

(12) United States Patent
Iqbal et al.

(10) Patent No.: US 9,758,377 B2
(45) Date of Patent: Sep. 12, 2017

(54) EXTRACTION OF HYDROXYAPATITE FROM FISH SCALES EMPLOYING IONIC LIQUIDS

(71) Applicant: COMSATS Institute of Information Technology, Lahore (PK)

(72) Inventors: Farasat Iqbal, Lahore (PK); Nawshad Muhammad, Lahore (PK)

(73) Assignee: COMSATS Institute of Information Technology, Lahore ( * ) Notice: Subject to any disclaimer, the term of this patent is extended or adjusted under 35 U.S.C. 154(b) by 196 days.

(21) Appl. No.: 14/932,195

(22) Filed: Nov. 4, 2015

(65) Prior Publication Data
US 2016/0376149 A1   Dec. 29, 2016

(30) Foreign Application Priority Data
Jun. 29, 2015   (PK) .................................. 424/2015

(51) Int. Cl.
  *C01B 25/00* (2006.01)
  *C01B 25/32* (2006.01)

(52) U.S. Cl.
  CPC .................................. *C01B 25/32* (2013.01)

(58) Field of Classification Search
  CPC .................................................... C01B 25/32
  USPC .............................. 423/157.5–161, 164, 305
  See application file for complete search history.

(56) References Cited

U.S. PATENT DOCUMENTS

| 2005/0191226 A1* | 9/2005 | Tuan ..................... C01B 25/32 423/307 |
| 2009/0036656 A1* | 2/2009 | Lai ..................... A61L 27/3604 530/427 |
| 2013/0292331 A1 | 11/2013 | Lipscomb et al. |

OTHER PUBLICATIONS

Panda et al., "Extraction and characterization of biocompatible hydroxyapatite from fresh water fish scales for tissue engineering scaffold" Bioprocess Biosyst. Eng. 2014, 37:433-440.*
Abstract of IN-201100212 I2, Jul. 5, 2013.*
Abstract of JP-2009107854 A, May 21, 2009.*
Abstract of JP-08104508 A, Apr. 23, 1996.*
Hu et al. Evaluation of 1-Ethyl-3-methylimidazolium Acetate Based Ionic Liquid Systems as a Suitable Solvent for Collagen, Journal of Applied Polymer Science, May 7, 2013, pp. 2245-2256, 130(4).

\* cited by examiner

*Primary Examiner* — Steven Bos
(74) *Attorney, Agent, or Firm* — H.C. Park & Associates, PLC (57) ABSTRACT

An exemplary embodiment provides a method for extracting hydroxyapatite. The method includes washing fish scales with water, drying the washed fish scales, grinding the washed fish scales, mixing the ground fish scales with an ionic liquid, and centrifuging the mixture of the ground fish scales and the ionic liquid to collect a hydroxyapatite powder as a precipitate.

18 Claims, 5 Drawing Sheets

EXTRACTION OF HYDROXYAPATITE FROM FISH SCALES EMPLOYING IONIC LIQUIDS

CROSS-REFERENCE TO RELATED APPLICATION

This application claims priority from and the benefit of Pakistani Patent Application No. 424/2015, filed on Jun. 29, 2015, which is hereby incorporated by reference for all purposes as if fully set forth herein.

BACKGROUND

Field

Exemplary embodiments relate to a method for extracting hydroxyapatite from fish scales employing an ionic liquid.

Discussion of the Background

Conventionally, each year 18-30 million tons of fish waste is discarded, which accounts for 50% of the total mass of fish processing industry in the world. In the fish waste, fish scales include an estimated 4% by weight. Fish scales mainly consist of collagen and hydroxyapatite in addition to fatty acids, vitamins, antioxidants, and other trace elements. Collagen is an abundant protein found in fish scales that has many applications in biomedical and pharmaceutical sciences. Hydroxyapatite ($Ca_5(PO_4)_3(OH)$), having similar properties with natural bones, is important for its use in traumatology, orthopedics, dentistry, mandibular, maxillofacial and craniofacial surgery.

Hydroxyapatite has been synthesized by various chemical methods such as solid state reaction, hydrothermal reaction, co-precipitation reaction, and sol-gel synthesis. Hydroxyapatite has also been extracted from various biological sources such as corals, bovine sources, fish scales, and bones.

However, all the aforementioned methods involve the use of acids, alkalis, or high temperatures for the extraction of hydroxyapatite from biological sources. Along with environmental issues related to the use of acids and alkalis, use of high temperature during the course of treatment results in distortion of the natural structure of the extracted hydroxyapatite. Additionally, use of conventional methods results in loss of major constituents (e.g., collagen), that have been acknowledged for various applications.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a novel method based on ionic liquid pretreatment for the extraction of hydroxyapatite from fish scales. A series of ionic liquids have been used in order to extract the hydroxyapatite from the fish scales obtained from various types of freshwater and saltwater fish. The naturally prepared hydroxyapatite has a huge potential as a viable and economical biomaterial for traumatology, orthopedics, dentistry, mandibular, maxillofacial, and craniofacial surgery, and can serve as a scaffold material for cell culture and a carrier for drug delivery systems.

Hydroxyapatite has been successfully isolated from fish waste (i.e., fish scales and other fish parts) using a simple one-step process at lower temperatures. The simple one-step process uses green chemistry by utilizing recyclable ionic liquids. The ionic liquids fully dissolve the organic component of the fish scales isolating the inorganic component (i.e., hydroxyapatite) as a precipitated product. The advantage of the exemplary embodiments is that the solvent (i.e., ionic liquids) are green and easily recyclable after the extraction process, and the dissolved organic component can be separated for further fractionation.

Additional aspects will be set forth in the detailed description which follows, and, in part, will be apparent from the disclosure, or may be learned by practice of the inventive concept.

An exemplary embodiment provides a method for extracting hydroxyapatite. The method includes washing fish scales with water, drying the washed fish scales, grinding the washed fish scales, mixing the ground fish scales with an ionic liquid, and centrifuging the mixture of the ground fish scales and the ionic liquid to collect a hydroxyapatite powder as a precipitate.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements.

In the accompanying figures, like reference numerals denote like elements.

For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, and/or sections, these elements, components, regions, layers, and/or sections should not be limited by these terms. These terms are used to distinguish one element, component, region, and/or section from another element, component, region, and/or section. Thus, a first element, component, region, and/or section discussed below could be termed a second element, component, region, and/or section without departing from the teachings of the present disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof; but do not preclude the presence or addition of one or more other features, integers, steps, operations, elements, components, and/or groups thereof.

Unless otherwise defined, all terms (including technical and scientific terms) used is herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Exemplary embodiments relate to a method of extraction of hydroxyapatite from the biological sources such as fish scales. Exemplary embodiments of the invention provide a method for preparing the hydroxyapatite powder using fish scales as a starting material and ionic liquid pretreatment to the fish scales for removing the organic ingredient. This is a method using the waste fish scales to produce a biomedical material. The ionic liquid is applied to dissolve organic component of the fish scales, thus enabling extraction of the valuable biomaterial of hydroxyapatite. Due to the nature of fish scales, the hydroxyapatite powder is a safe starting material that is economical for fabrication of porous scaffolds. The extracted hydroxyapatite may be used in various orthopedics and dental surgical applications. The method is a one spot extraction process in which the green solvent recyclability and recovery is ensured, thus enabling the hydroxyapatite isolation via a simple, safe, and cost effective route. Advantages of the process include lower temperatures, which maintain the natural structure and biological properties of fish scale-based hydroxyapatite, which is the dissolved organic component of the fish scale contained in the reaction mixture of the ionic liquid that may be fractioned in to other valuable biomaterials and compounds such as collagen, proteins, and vitamins. Another advantage is that the method involves a negligible amount of waste as the inorganic and organic portion of the raw material is almost consumed totally as it is converted into valuable products.

Figure 1:
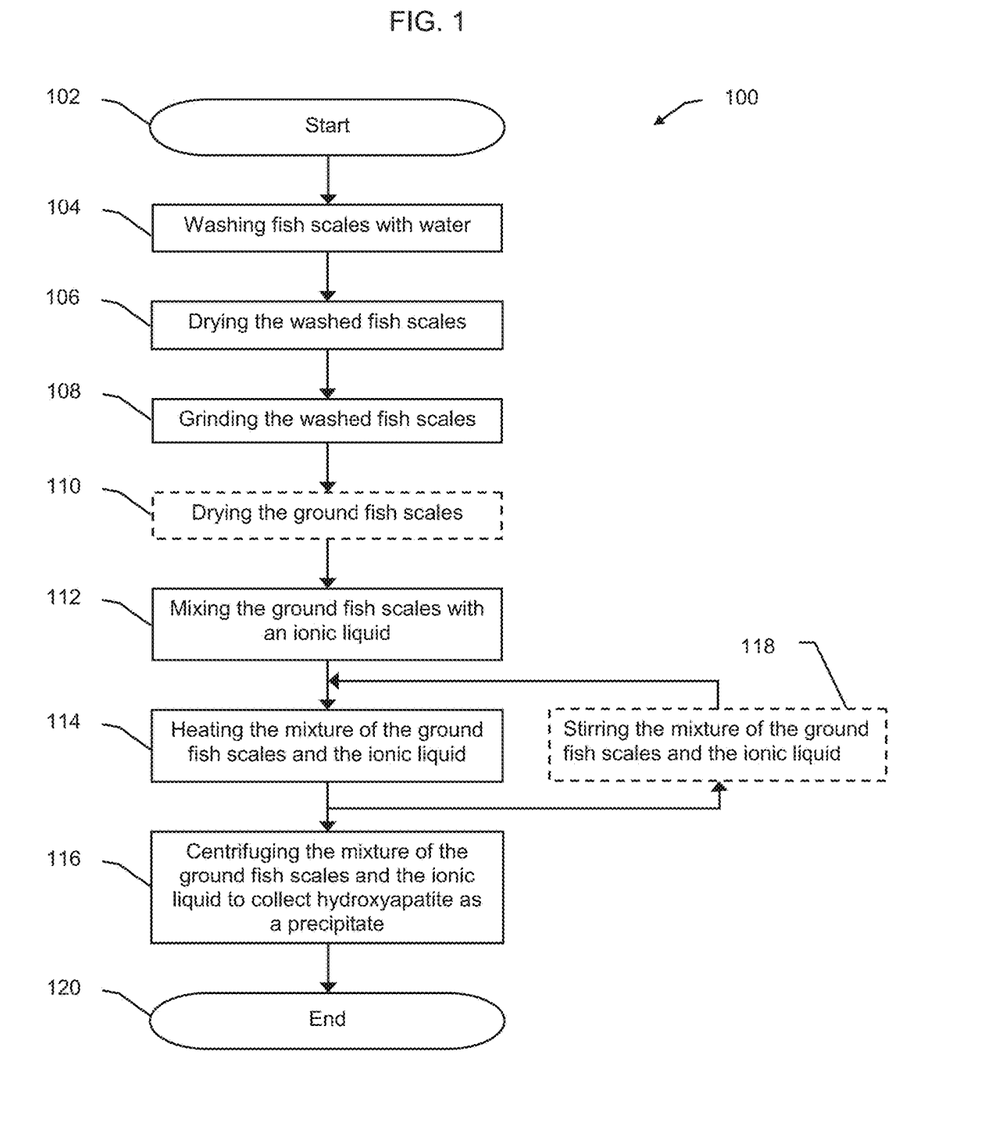
FIG. 1 illustrates a process diagram extracting hydroxyapatite using an ionic liquid pre-treatment in accordance with an exemplary embodiment.

FIG. 1 illustrates an exemplary embodiment method 100 for extracting hydroxyapatite from fish scales. Fish scales of different fish species (i.e., fresh and salt water species including carp and tilapia) were collected from the local fish market and then the method starts in starting block 102. While carp and tilapia are two fish species listed, other fish species may be used.

In block 104, the method provides washing the fish scales with water. For example, the fish scales may be washed with tap water, distilled water, and/or deionized water to ensure the removal of insoluble materials.

In block 106, the method provides drying the washed fish scales. The washed fish scales may be dried at room temperature. The washed fish scales may be partially dried such that the fish scales remain in a wet state. For example, the washed fish scales may be dried such that the ratio of fish scales to water (e.g., deionized water) is 1:3. Alternatively, the washed fish scales may be fully dried removing all water (i.e., in a dry state).

In block 108, the method provides grinding the washed fish scales. The washed fish scales may be ground with a shear mixer in a wet state (i.e., in a ratio of 1:3 of fish scales to water) to form a slurry. For example, the shear mixer may rotate at a speed between about 1000 to 12,000 revolutions per minute (rpm) in order to grind the washed fish scales and the water to form the fish scale slurry.

The washed fish scales may also be ground with a shear mixer in a dry state to form a sponge matrix. The shear mixer may spin its mixing blades at a speed between about 1000 to 12,000 rpm when grinding the dry fish scales to form the sponge matrix.

In optional block 110, the method provides drying the ground fish scales (i.e. the fish scale slurry). The fish scale slurry may be dried between about 40° C. to 80° C. The fish scale slurry may be dried at 60° C. The ground fish scales may be dried using lyophilization or oven drying.

In block 112, the method provides mixing of the ground fish scales with an ionic liquid. The fish scales may be mixed with the ionic liquid in a reagent bottle. The reagent bottle may be charged with the ionic liquid first, and followed by addition of ground fish scales. The grounded fish scales may be added to the reagent bottle with the ionic liquid such that the mixture comprises approximately 2-15% (wt/wt) of the fish scale to the ionic liquid fish scale solution. The mixture may comprise 5% (wt/wt) fish scales in one exemplary embodiment. The mixture may comprise 10% (wt/wt) fish scales in another exemplary embodiment.

In block 114, the method provides heating the mixture of the ground fish scales and the ionic liquid. For example, the method may include closing the reaction vessel (or the reagent bottle), keeping the reaction vessel closed, placing the reaction vessel in an oil bath, heating the reagent vessel for 1-12 hours at 70-160° C. For example, the reaction vessel may be heated for 3-10 hours at 70-160° C. In another exemplary embodiment, the reaction vessel may be heated for 3-10 hours at 100° C.

The method 100 may also include optional block 118. In optional block 118, the method provides stirring the mixture of the ground fish scales and the ionic liquid. For example, the method may provide stirring the mixture of the ground fish scales and the ionic liquid at 100-800 rpm while the mixture is heated as described with respect to block 116. The method may provide stirring the mixture of the ground fish scales and the ionic liquid at 400 rpm. The mixture of the ground fish scales and the ionic liquid may be stir until the method moves to block 114. The dissolution method steps of blocks 112, 114, and 120 may occur at atmospheric pressure.

In block 114, the method provides centrifuging the mixture of the ground fish scales and the ionic liquid to collect the hydroxyapatite powder as a precipitate. For example, after the dissolution process in blocks 112, 114, and 120, the hydroxyapatite may be obtained as a precipitate by centrifuging the mixture at 3000-15000 rpm. For example, the centrifugation may occur at 6000 rpm.

The supernatant contained the ionic liquid and other constituents of fish scale may be further subjected to fractionation and ionic liquid may be recycled. Although, portions of this application refer to using a single ionic liquid, mixtures of ionic liquids may be used. The method 100 may end at terminal block 120.

Ionic liquids are molten salts that may melt below 100° C. Ionic liquid may comprise organic cations and organic and inorganic anions. In an exemplary embodiment, the ionic liquid comprise a cation structure based on at least one of imidazolium, pyridinium, ammonium, and phosphonium and an anion structure based on at least one of acetate, formate, lactate, chloride, and phosphate. In an exemplary embodiment, the ionic liquid comprises at least one of 1-n-butyl-3-methylimidazolium acetate, 1-n-ethyl-3-methylimidazolium acetate, 1-n-butyl-3-methylimidazolium chloride, 1-n-ethyl-3-methylimidazolium chloride, 1-allyl-3-methyl imidazolium chloride, 3-methyl-N-butylpyridinium chloride, 3-methyl-N-butylpyridinium acetate, 1-ethyl-3-methyl imidazolium propionate, cholineacetate, tri-ethanol amine acetate, tri-ethanol amine lactate, and tri-ethanol amine formate Examples 1-7 below describe various experiments of extracting the hydroxyapatite from the fish scales by changing only one variable to optimize the extraction method. Example 1 uses the same processes above except that different ionic liquids or combinations of ionic liquids are used. Example 2 specifically uses 1-n-butyl-3-methylimidazolium acetate as the ionic liquid. Example 3 varies the temperature of heating the fish scales and uses 1-n-butyl-3-methylimidazolium acetate in the reaction vessel. Example 4 varies the time that the fish scales and 1-n-butyl-3-methylimidazolium acetate are heated in the reaction vessel. Example 5 varies the speed at which centrifugation occurs for collecting the hydroxyapatite precipitate. Example 6 varies the weight charge ratio of the fish scales and 1-n-butyl-3-methylimidazolium acetate. Example 7 includes stirring of the fish scales and the 1-n-butyl-3-methylimidazolium acetate in the reaction vessel when it is heated at various speeds.

Example 1

Fish scales of different fish species (i.e., fresh and salt water species including Carp and Tilapia) were collected followed by thoroughly washing with tap water and distilled water to ensure the removal of insoluble materials. After washing, the fish scales were dried at room temperature and then ground in wet or dry state followed by drying the slurry at 40° C. to 80° C. For example, at 60° C. Each ionic liquid used in the process were charged in a reagent bottle followed by addition of grounded fish scales. The ionic liquids comprise at least one of 1-n-butyl-3-methylimidazolium acetate, 1-n-ethyl-3-methylimidazolium acetate, 1-n-butyl-3-methylimidazolium chloride, 1-n-ethyl-3-methylimidazolium chloride, 1-allyl-3-methyl imidazolium chloride, 3-methyl-N-butylpyridinium chloride, 3-methyl-N-butylpyridinium acetate, 1-ethyl-3-methyl imidazolium propionate, cholineacetate, tri-ethanol amine acetate, tri-ethanol amine lactate, and tri-ethanol amine formate. The fish scale powder was charged in a ratio of 10% (wt/wt). After charging, the reaction vessel was kept closed and heated in an oil bath for 10 hours at 100° C. After the dissolution process, the hydroxyapatite was obtained as precipitate by centrifugation at 6000 rpm. The supernatant contained the ionic liquids and other constituents of fish scales were further subjected to fractionation and ionic liquids were recycled.

Example 2

Fish scales of different fish species (i.e. fresh and salt water species including carp and tilapia), were collected followed by thoroughly washing with tap water and distilled water to ensure the removal of insoluble materials. After washing, the fish scales were dried at room temperature and then ground in wet or dry state followed by drying the slurry at 40° C. to 80° C. For example, at 60° C. The ionic liquid of 1-n-butyl-3-methylimidazolium acetate was charged in a reagent bottle followed by addition of grounded fish scales powder. The fish scale powder was charged in ratio of 10% (wt/wt). After charging, the reaction vessel was kept closed and heated in an oil bath for 10 hours at 100° C. After dissolution process, the hydroxyapatite was obtained as precipitate which was collected by centrifugation at 6000 rpm. The supernatant contained the ionic liquids and other constituents of fish scales were further subjected to fractionation and ionic liquids were recycled.

Example 3

Fish scales of different fish species (i.e., fresh and salt water species including Carp and Tilapia), were collected followed by thoroughly washing with tap water and distilled water to ensure the removal of insoluble materials. After washing, the fish scales were dried at room temperature and then ground in wet or dry state followed by drying the slurry at 40° C. to 80° C. For example, at 60° C. The ionic liquid of 1-n-butyl-3-methylimidazolium acetate was charged in a reagent bottle followed by addition of grounded fish scales. The fish scale powder was charged in ratio of 10% (wt/wt). After charging, the reaction vessel was kept closed and heated in an oil bath for 10 hours at various temperatures. For example, the reaction vessel was heated to at least one of 70, 80, 90, 100, 110, 120, 130, 140, 150, and 160° C. for 10 hours. After dissolution process, the hydroxyapatite was obtained as precipitate which was collected by centrifugation at 6000 rpm. The supernatant contained the ionic liquids and other constituents of fish scale were further subjected to fractionation and ionic liquids were recycled.

Example 4

Fish scales of different fish species (i.e., fresh and salt water species including carp and tilapia), were collected followed by thoroughly washing with tap water and distilled water to ensure the removal of insoluble materials. After washing, the fish scales were dried at room temperature and then ground in wet or dry state followed by drying the slurry at 40° C. to 80° C. For example, at 60° C. The ionic liquid of 1-n-butyl-3-methylimidazolium acetate was charged in a reagent bottle followed by addition of grounded fish scales. The fish scale powder was charged in ratio of 10% (wt/wt). After charging, the reaction vessel was kept closed and heated in an oil bath for 1-12 hours at 100° C. For example, 1 hour, 2, hours, 3, hours, 4, hours, 5 hours, 6 hours, 7 hours, 8 hours, 9 hours, 10 hours, 11 hours, or 12 hours at 100° C. After pretreatment process, the hydroxyapatite was obtained as precipitate which was collected by centrifugation at 6000 rpm. The supernatant contained the ionic liquids and other constituents of fish scales were further subjected to fractionation and ionic liquids were recycled.

Example 5

Fish scales of different fish species (i.e., fresh and salt water species including carp and tilapia were collected followed by thoroughly washing with tap water and distilled water to ensure the removal of insoluble materials. After washing, the fish scales were dried at room temperature and then ground in wet or dry state followed by drying the slurry at 40° C. to 80° C. For example, at 60° C. The ionic liquid of 1-n-butyl-3-methylimidazolium acetate was charged in a reagent bottle followed by addition of grounded fish scales. The fish scale powder was charged in ratio of 10% (wt/wt). After charging, the reaction vessel was kept closed and heated in an oil bath for 10 hours at 100° C. After pretreatment process, the hydroxyapatite was obtained as precipitate which was collected by centrifugation ranging from 3000-15000 rpm. For example the centrifugation occurred at 3000 rpm, 4000 rpm, 5000 rpm, 6000 rpm, 7000 rpm, 8000 rpm, 10000 rpm, 11000 rpm, 12000 rpm, 13000 rpm, 14000 rpm, and 15000 rpm. The supernatant contained the ionic liquids and other constituents of fish scales were further subjected to fractionation and ionic liquids were recycled.

Example 6

Fish scales of different fish species (e.g., fresh and salt water species including carp and tilapia were collected followed by thoroughly washing with tap water and distilled water to ensure the removal of insoluble materials. After washing, the fish scales were dried at room temperature and then ground in wet or dry state followed by drying the slurry at 40° C. to 80° C. For example, at 60° C. The ionic liquid of 1-n-butyl-3-methylimidazolium acetate was charged in a reagent bottle followed by addition of ground fish scales. The fish scale powder was charged in the range of 1-15% (wt/wt). For example, the fish scale powder was charged in the range of 1%, 2%, 3%, 4%, 5%, 6%, 7%, 8%, 9%, 10%, 11%, 12%, 13%, 14%, and 15% (wt/wt). After charging, the reaction vessel was kept closed and heated in an oil bath for 10 hours at 100° C. After pretreatment process, the hydroxyapatite was obtained as precipitate which was collected by centrifugation at 6000 rpm. The supernatant contained the ionic liquids and other constituents of fish scales were further subjected to fractionation and ionic liquids were recycled.

Example 7

Fish scales of different fish species (i.e., fresh and salt water species including carp and tilapia were collected followed by thoroughly washing with tap water and distilled water to ensure the removal of insoluble materials. After washing, the fish scales were dried at room temperature and then ground in wet or dry state followed by drying the slurry at 40° C. to 80° C. For example, at 60° C. The ionic liquid of 1-n-butyl-3-methylimidazolium acetate was charged in a reagent bottle followed by addition of grounded fish scales. The fish scale powder was charged in the range of 1-15% (wt/wt). After charging, the reaction vessel was kept closed and heated in an oil bath with stirring at 100-800 rpm for 10 hours at 100° C. For example, stirring at 100 rpm, 200 rpm, 300 rpm, 400 rpm, 500 rpm, 600 rpm, 700 rpm, or 800 rpm. After pretreatment process, the hydroxyapatite was obtained as precipitate which was collected by centrifugation at 6000 rpm. The supernatant contained the ionic liquids and other constituents of fish scales were further subjected to fractionation and ionic liquids were recycled.

The collected hydroxyapatite powder from fish scales was subjected to various characterizations to confirm that the ionic liquid pretreatment process of method 100 removed all organic components. In order to investigate the removal efficiency, the extracted powder of hydroxyapatite was characterized by Fourier transformed infrared spectroscopy (FTIR), X-ray diffraction (XRD), thermogravimetric analysis (TGA), and scanning electron microscopy (SEM).

Figure 2:
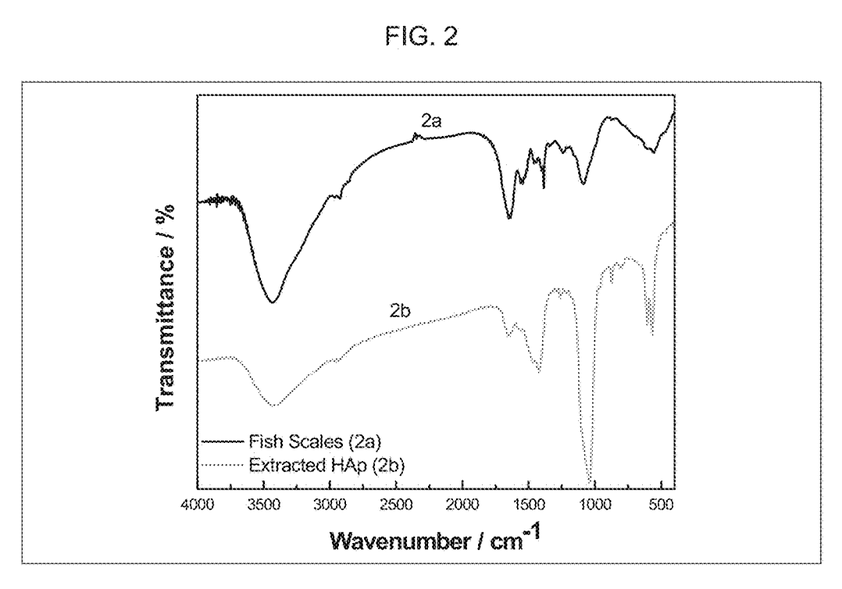
FIG. 2 is a Fourier transform infrared spectroscopy (FTIR) spectra of fish scales (2a) and extracted hydroxyapatite (2b) according to an exemplary embodiment.

FTIR Analysis:

The FTIR spectra were recorded for fish scales and of the extracted hydroxyapatite to identify the calcium and phosphate characteristics peaks as depicted in FIG. 2. The amide II of collagen has vibration band around 1544 $cm^{-1}$. The amide II collagen band is present in the fish scales but absent in the extracted hydroxyapatite. The bands at 1418 and 872 $cm^{-1}$ are assigned to the asymmetric stretching and out of plan bending mode of carbonate group ($CO_3^{-2}$) are more obvious in the extracted hydroxyapatite spectra than the fish scales. The bands at 1251 $cm^{-1}$ related to carbonate group $CO_3^{-2}$ while the band at 1235 $cm^{-1}$ assigned to amide III of collagen skeleton. The more visible bands at 1039 $cm^{-1}$, 600 $cm^{-1}$, and 559 $cm^{-1}$ indicate the asymmetric stretching, and the symmetric and asymmetric bending vibrations of phosphate group ($PO_4^{-3}$) of extracted hydroxyapatite as compared to fish scale. This shows that the ionic liquid pretreatment removed all the organic components of the fish scales which resulted in the inorganic hydroxyapatite powder.

Figure 3:
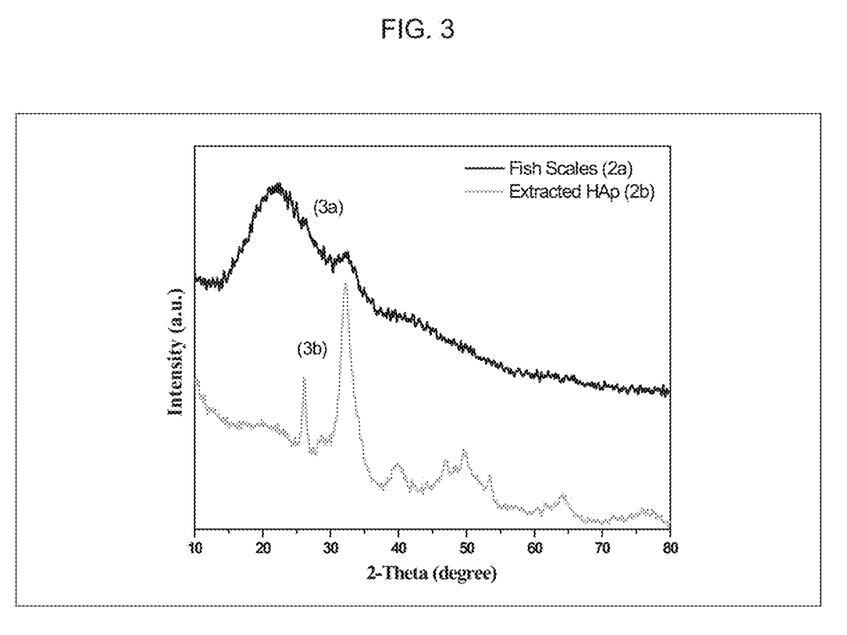
FIG. 3 is an X-ray diffraction (XRD) analysis of fish scales (3a) and extracted hydroxyapatite (3b) according to an exemplary embodiment.

XRD Analysis:

Referring to FIG. 3, the XRD patterns of fish scale (3a) and extracted hydroxyapatite (3b) are shown. The fish scale has a broad peak at 2θ value of 22° along with small shoulder peak at 2θ value of 32.2° corresponding to the collagen biopolymer and hydroxyapatite, respectively. In the extracted hydroxyapatite, the collagen peak at 22° is disappeared and strong peak of hydroxyapatite at 2θ value of 32.2° emerged which shows that ionic liquid removed all the organic components and the resulted powder is purely hydroxyapatite.

Figure 4:
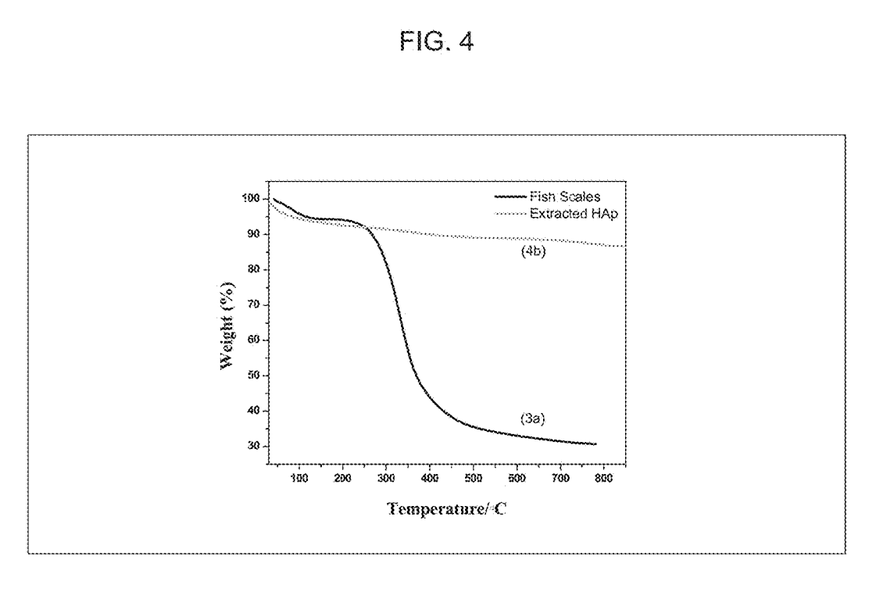
FIG. 4 is a thermogravimetric analysis (TGA) of fish scales (4a) and extracted hydroxyapatite (4b) according to an exemplary embodiment.
Figure 5:
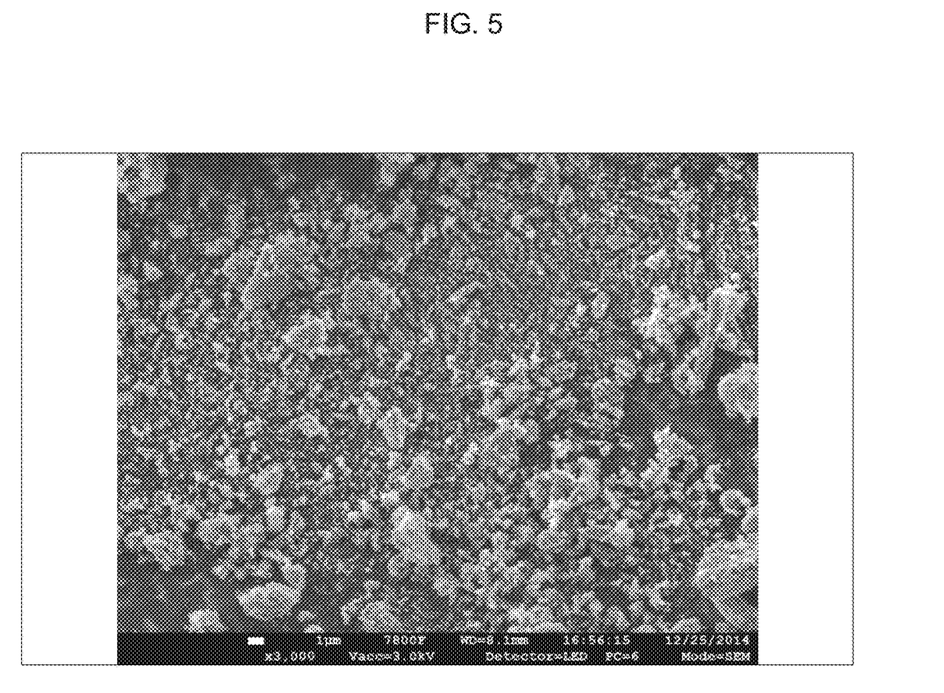
FIG. 5 is a field-emission scanning electron microscopy (FE-SEM) micrograph of fish scales extracted hydroxyapatite powder according to an exemplary embodiment.

TGA Analysis:

Referring to FIG. 4, the thermal degradation behavior of fish scales and extracted hydroxyapatite is shown. The first weight loss (6%) was observed at a temperature less than 200° C. for both fish scale and extracted hydroxyapatite that corresponded to adsorbed water. From 200-500° C., 58% weight loss was measured for fish scales corresponding to the decomposition of organic matrix. In the case of extracted hydroxyapatite, a very minor weight loss occurred in between 200-500° C. The minor weight loss of the extracted hydroxyapatite relates to hydrocarbons decomposition. This result confirms that during the ionic liquid treatment of the fish scales, the organic compounds were removed efficiently and pure hydroxyapatite powder was extracted. The decomposition of the hydrocarbons was likely due to the decarburization of $CaCO_3$ to form CaO for both fish scale and extracted hydroxyapatite.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A method for extracting hydroxyapatite, comprising;
  washing fish scales with water;
  drying the washed fish scales;
  grinding the washed fish scales;
  mixing the ground fish scales with an ionic liquid; and
  centrifuging the mixture of the ground fish scales and the ionic liquid to collect a hydroxyapatite powder as a precipitate.

2. The method of claim 1, wherein:
   washing the fish scales comprises washing with deionized water,
   drying the washed fish scales is conducted at room temperature and drying the washed fish scales at room temperature provides a ratio of the fish scales to the deionized water of 1:3, and
   grinding of the fish scales comprises grinding the fish scales in a wet state with a shear mixer such that the ratio of the fish scales to the deionized water is 1:3.

3. The method of claim 2, wherein the shear mixer is rotated at a speed of 1000 revolutions per minute (rpm) to 12,000 rpm to grind the fish scales to form a slurry.

4. The method of claim 1, wherein:
   the fish scales are washed with deionized water,
   drying the fish scales is conducted at room temperature and drying the washed fish scales at room temperature completely removes the deionized water, and
   grinding of the fish scales further comprises grinding the fish scales in a dry state without the deionized water with a shear mixer rotated at a speed of 1000 revolutions per minute (rpm) to 12,000 (rpm) to form a sponge matrix in the dry state.

5. The method of claim 2, further comprising:
   drying the ground fish scales into dry powder comprising organic and inorganic constituents using an oven at a temperature range of 40° C. to 80° C.

6. The method of claim 5, wherein the ionic liquid comprises a cationic structure of at least one of imidazolium, pyridinium, ammonium, phosphonium and an anionic structure of at least one of acetate, formate, lactate, chloride, and phosphate.

7. The method of claim 6, wherein the ionic liquid comprises at least one of 1-n-butyl-3-methylimidazolium acetate, 1-n-ethyl-3-methylimidazolium acetate, 1-n-butyl-3-methylimidazolium chloride, 1-n-ethyl-3-methylimidazolium chloride, 1-allyl-3-methyl imidazolium chloride, 3-methyl-N-butylpyridinium chloride, 3-methyl-N-butylpyridinium acetate, 1-ethyl-3-methyl imidazolium propionate, choline acetate, tri-ethanol amine acetate, tri-ethanol amine lactate, and tri-ethanol amine formate.

8. The method of claim 1, wherein the mixture of the ground fish scales and the ionic liquid comprises 2-15% (wt/wt) of the ground fish scales.

9. The method of claim 8, wherein the mixture of the ground fish scales and the ionic liquid comprises 10% (wt/wt) ground fish scales.

10. The method of claim 1, further comprising:
    heating the mixture of the ground fish scales and the ionic liquid in a range of 70° C. to 160° C.

11. The method of claim 10, wherein the mixture of the ground fish scales and the ionic liquid is heated to 100° C.

12. The method of claim 10, wherein the mixture of the ground fish scales and the ionic liquid is heated in a range of 70° C. to 160° C. for 1 to 12 hours.

13. The method of claim 12, wherein the mixture of the ground fish scales and the ionic liquid is heated in a range of 70° C. to 160° C. for 10 hours.

14. The method of claim 10, further comprising:
    stirring the mixture of the ground fish scales and the ionic liquid at between 100 rpm and 800 rpm.

15. The method of claim 14, wherein the mixture of the ground fish scales and the ionic liquid is stirred at about 400 rpm.

16. The method of claim 14, the mixture of the ground fish scales and the ionic liquid is heated and stirred at atmospheric pressure.

17. The method of claim 1, wherein the mixture of the ground fish scales and the ionic liquid is centrifuged at between 3000 rpm and 15000 rpm to collect the hydroxyapatite powder as the precipitate.

18. The method of claim 17, wherein the mixture of the ground fish scales and the ionic liquid is centrifuged at about 6000 rpm to collect the hydroxyapatite powder as the precipitate.

* * * * *